Oct. 5, 1926.
A. KERN
COCK OR VALVE
Filed Dec. 8, 1924
1,602,270
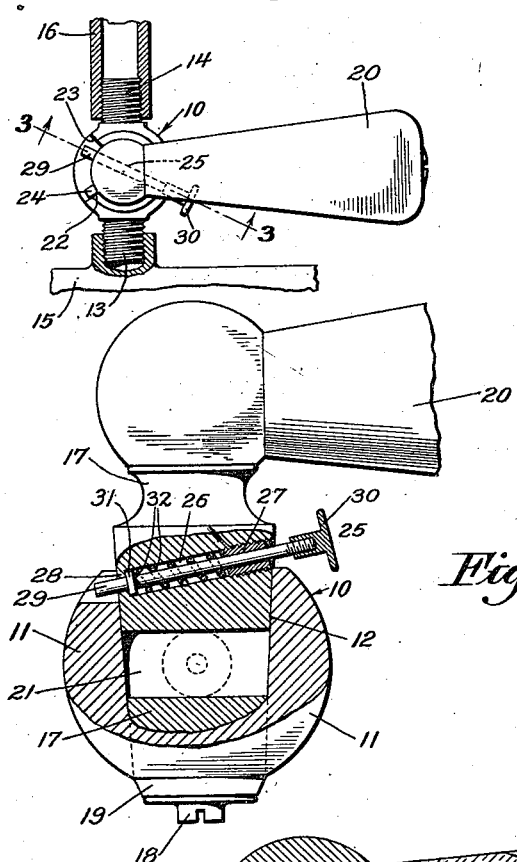
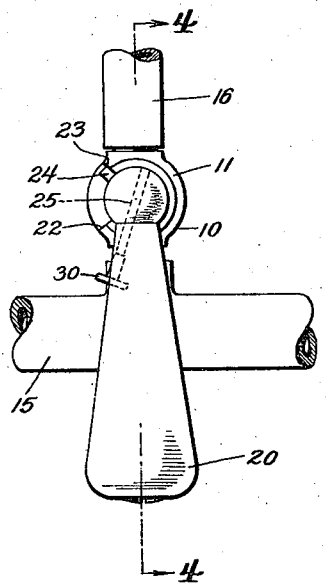
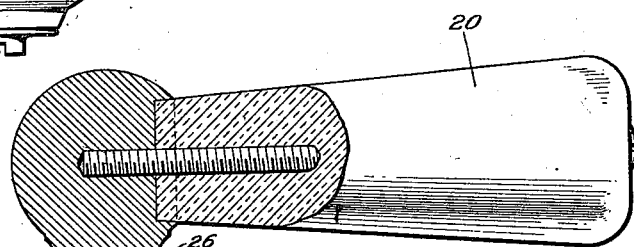
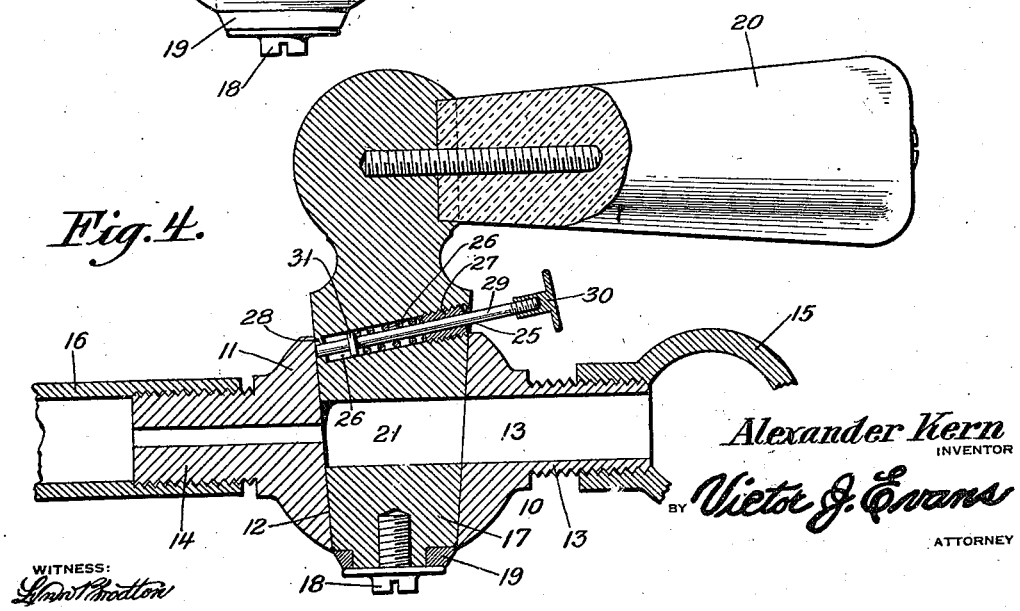
Alexander Kern
INVENTOR
BY Victor J. Evans
ATTORNEY
WITNESS:

Patented Oct. 5, 1926.

1,602,270

UNITED STATES PATENT OFFICE.

ALEXANDER KERN, OF ELMHURST, NEW YORK.

COCK OR VALVE.

Application filed December 8, 1924. Serial No. 754,680.

This invention relates to improvements in cocks or valves and has particular reference to cocks for gas stoves which control the flow of gas from the manifold or supply pipe to the respective burners.

The principal object of the invention resides in the provision of a cock which is normally locked when in a shut or closed position whereby the danger of the cock being accidentally turned on is eliminated and the results which often occur from such accidents are avoided.

Another object of the invention resides in a safety cock which includes a locking means capable of being manipulated with the same hand employed for moving the handle of the cock to an open position, and which means is automatically operated to lock the cock in a closed position when the handle is moved to shut off the supply of gas to the burner.

A further object of the invention is to provide a locking means for a gas cock which may be applied to cocks now in use, and which is simple in construction, cheap of manufacture and positive in its action.

With these and other objects in view, the invention resides in certain novel construction and combination and arrangement of parts, the essential features of which are hereinafter fully described, are particularly pointed out in the appended claim, and are illustrated in the accompanying drawing, in which:—

Figure 1 is a top plan view of my improved safety cock showing the same in an "off" position.

Figure 2 is a similar view but showing the cock in an "on" position.

Figure 3 is an enlarged sectional view on the line 3—3 of Figure 1.

Figure 4 is an enlarged sectional view on the line 4—4 of Figure 2.

Referring more particularly to the drawing, the reference numeral 10 designates my improved safety gas cock in its entirety, and which includes a casing 11 having a tapered valve seat 12 formed therein, and attaching nipples 13 and 14 extending on opposite sides of the casing and to which the manifold or supply pipe 15 and pipe 16 leading to the burner are respectively connected. A tapered plug or valve 17 is held in the seat 12 by the usual screw 18 threaded in the lower end of the plug and bearing against a washer 19. A handle 20 is carried by the head of the plug whereby the said plug may be rotated to bring the passage 21 in the plug into and out of register with the inlet and exhaust ports extending through the nipples 13 and 14 respectively. The top face of the casing 11 is cut-away to provide spaced shoulders 22 and 23 which are engaged by an outwardly extending pin 24, the said pin co-acting with the shoulder 22 when the valve is in an off position and with the shoulder 23 when the valve is in an on position to limit rotation of the plug in bringing the passage 21 in alignment with the inlet and outlet ports of the casing. The construction thus far described is old in the art, but it is to this type of cock to which my improved locking means 25 is applied.

The means 25 includes a bore 26 tapped in the plug 17 at an angle on a plane above the top of the casing, one end of which is internally screw threaded for the reception of a removable threaded bushing 27. The other end of the bore is formed with an abutment 28 which co-acts with the bushing 27 for slidably supporting a plunger rod 29. A portion of the plunger rod 29 is movable into the cut-out portion of the casing between the shoulders 22 and 23 and the other end projects to a point adjacent the handle 20 beneath the same, and terminates in a manipulating knob 30. A collar 31 is formed on the plunger and is arranged within the bore, and a spring 32 is interposed between the collar 31 and the bushing 27 which tends to force the end of the plunger into the space between the shoulders when the plug is moved to a closed position, at which time it engages the shoulder 23 and co-acts with the pin 24 and shoulder 22 for preventing the plug from turning in either direction.

In operation, we shall presume that the valve is in an off position as shown in Figure 1 and it is desired to turn the handle 20 to move the plug to an open position.

The handle is grasped by the hand of the operator and by reason of the knob 30 being disposed adjacent the handle, it is possible to simultaneously pull outward upon the plunger rod against the tension of the spring to retract the end of the plunger within the confines of the inner wall of the casing which will permit the plug to be rotated until the pin 24 engages the shoulder 23. The passage 21 in the plug is now in alignment with the inlet and outlet ports of the casing and the fluid or gas is free to pass from the manifold to the burner. When the cock is shut off, the handle is moved to a position parallel with the manifold 15 and as the end of the plunger moves to the cut-out portion past the shoulder 23, the spring 32 will automatically extend the plunger into the cut-out, the movement of the plunger being limited by the collar 31 engaging the abutment 28.

From the foregoing description, it will be seen that I have provided a safety gas cock which is automatically operable upon the closing of the cock whereby to lock the same against being accidentally turned on by unauthorized persons such as children. The device is also constructed so as to be operable should the spring 32 accidentally become broken as the plunger may be forced to an extended position by the operator. The device is also capable of operation in the event that the manipulating end of the plunger should become bent while the plunger is in a locking position.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

In a device of the class described, the combination of a valve casing having inlet and outlet ports, a plug rotatable within said casing and having a passage for alignment with said ports when the plug is turned to an "on" position, a handle extending from said plug, spaced shoulders provided on the top of said casing, a pin extending from said plug and engageable with said shoulders for limiting movement of said plug to "on" and "off" positions, said plug having a bore therein arranged at an angle so that the ends of the bore open respectively above the top of the casing and within the space between said shoulders, a plunger rod slidably mounted within said bore, a stop carried by said plunger rod for co-action with one end wall of said bore for limiting the outward movement of one end of said plunger rod within the space between said shoulders, a spring interposed between said stop and another end wall of said bore for normally forcing one end of said plunger rod into the space between said shoulders for engagement with one of the shoulders for co-action with said pin and other shoulder for locking said plug against turning movement to an "on" position, and a manipulating portion on the other end of said plunger rod and disposed below the handle whereby said plunger rod may be manually retracted against the action of said spring and out of the path of said shoulders when said handle is grasped to turn said plug to bring said passage into alignment with said inlet and outlet ports.

In testimony whereof I have affixed my signature.

ALEXANDER KERN.